March 4, 1941.   I. GURWICK   2,233,945
METHOD OF PACKAGING MATERIALS
Filed Dec. 6, 1939
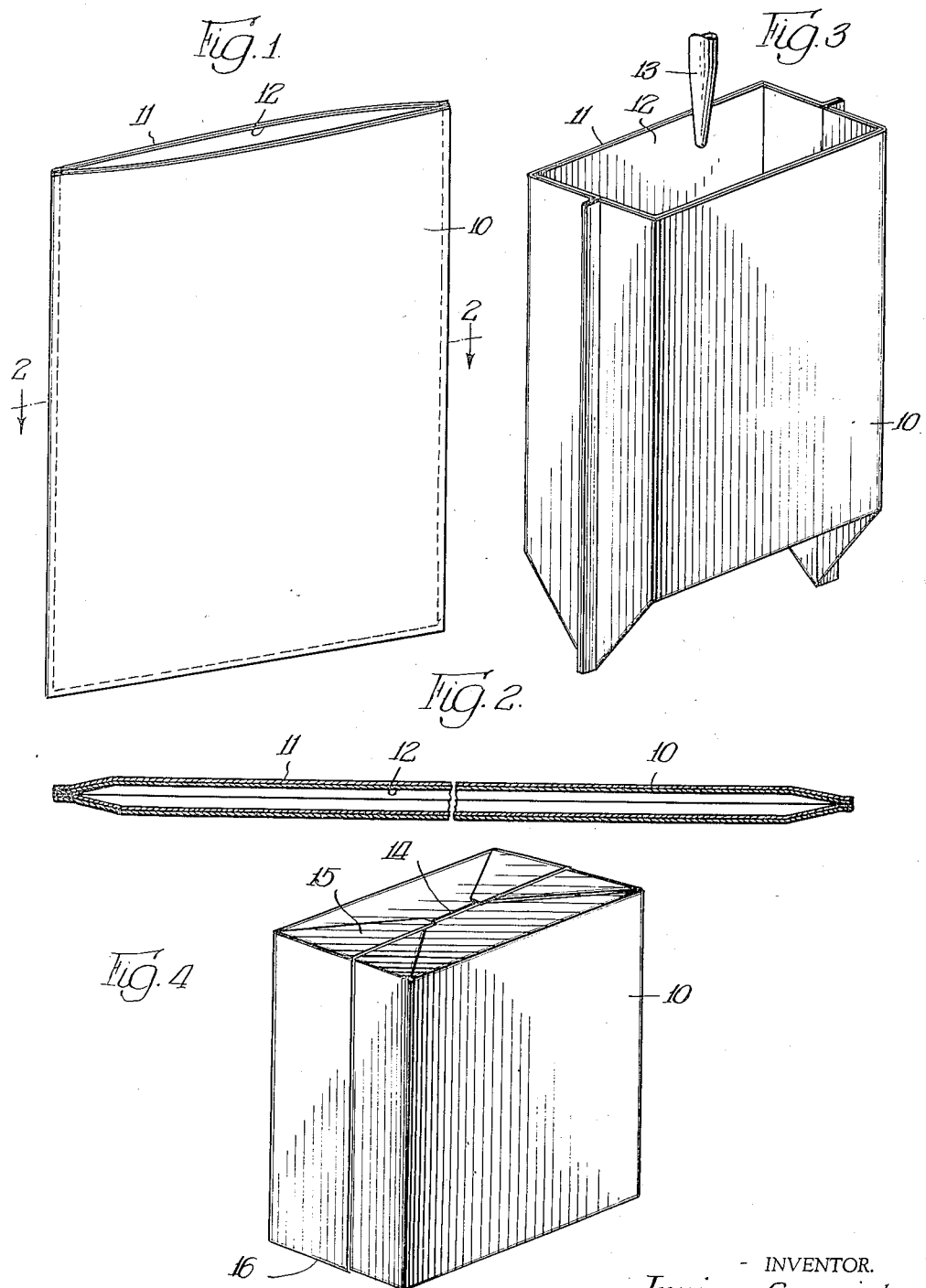
INVENTOR.
Irving Gurwick,
BY Cromwell, Greist & Warden.
ATTORNEYS.

Patented Mar. 4, 1941

2,233,945

UNITED STATES PATENT OFFICE 2,233,945

METHOD OF PACKAGING MATERIALS

Irving Gurwick, Mount Vernon, Ohio, assignor to Shellmar Products Company, Mount Vernon, Ohio, a corporation of Delaware Application December 6, 1939, Serial No. 307,860

5 Claims. (Cl. 93—6)

The present invention relates to an improved method of packaging materials in bags, pouches, envelopes or other types of containers constructed at least in part of material of the type known as "Pliofilm" composed of rubber hydrochloride.

A principal object of the invention is to provide a method of packaging materials in containers formed of transparent rubber hydrochloride whereby the materials can be loaded in the container and the latter can be crimped or pressed into compact form without damage to the rubber hydrochloride.

An additional object of the invention is the provision of a method for packaging materials in containers formed of transparent rubber hydrochloride in which the containers are squared up from flattened form into open position and a blast of a hot gas or other heating medium is directed against the interior of the package for a time sufficiently long to exert a softening effect upon the transparent rubber hydrochloride, the container thereafter being filled, preferably after at least partial cooling of the container, and crimped or pressed into flattened condition without damage to the transparent rubber hydrochloride.

These and other objects will be observed upon a consideration of the following specification and by reference to the accompanying drawing, in which Fig. 1 is a perspective view of a flattened container formed of an interior of transparent rubber hydrochloride laminated to a paper back;

Fig. 2 is a section taken on line 2—2 of Fig. 1;

Fig. 3 is a perspective view showing the container of Fig. 1 being squared into open position adjacent a square nozzle; and Fig. 4 is a perspective view of a finished package constructed in accordance with the invention.

Transparent rubber hydrochloride has met with considerable favor in the formation of containers. The material has high moistureproof qualities and generally is desirable in packaging commodities which require protection from drying, oxidation or the like. One type of container produced from transparent rubber hydrochloride which has met with particular favor is shown in Fig. 1 and consist of an interior sheet or layer of transparent rubber hydrochloride which is laminated to an exterior paper covering. This bag indicated at 10 may be formed by laminating a sheet of transparent rubber hydrochloride to a sheet of kraft paper, cutting the laminated sheet into complementary sections which are placed in edge alignment, and heat-sealing the adjacent edges to join the rubber hydrochloride in permanently sealed fashion. The paper covering 11 then extends entirely across the container and is coextensive with the transparent rubber hydrochloride liner 12.

The method of forming this container and the particular structure of the container do not constitute a part of the present invention. It will be understood that the invention is applicable to bags, envelopes, pouches and the like.

In utilizing containers of this general type the bag initially is opened for receipt of the materials to be packaged therein. This usually involves squaring the bag in opened position, as shown in Fig. 3. The squaring of the bag itself causes a distortion from planular position of the sheets, and due to the relatively stiff nature of the paper to which the transparent rubber hydrochloride is laminated the latter material has a tendency to become damaged by the distortion.

After the bag is opened it is filled with material to be packaged and then closed for heat-sealing. The sealing operation generally includes crimping the adjacent sides of the open end of the bag together under heat and pressure and then flattening or pressing the extending portions of the package against its sides to produce a compact and attractive finished package. These various operations have a serious tendency to break or unduly distort the transparent rubber hydrochloride, thereby weakening the package and reducing its retention properties.

These objectionable effects may be avoided by initially opening the bag and blowing into it a heated gas which has a softening effect upon the rubber hydrochloride that will persist for a time sufficiently long to allow for the completion of the folding operations before the rubber hydrochloride again sets in a more rigid form.

After the bag is opened up into the position shown in Fig. 3 the bag is brought adjacent a source of heated air or other gas indicated at 13. The source of the heated air generally is the discharge end of a hot air blower and acts to direct into the interior of the bag a blast of air which has been heated to a point sufficiently high to exert a softening effect upon the rubber hydrochloride of the opened bag, thus causing this material to lose its internal stresses and danger of damage from external pressure. A somewhat unique characteristic of transparent rubber hydrochloride is that even after this blast of hot air the material retains its sheet form but eventually will set in the new position. However, this setting does not occur at once even when the transparent rubber hydrochloride is cooled. The material seems to retain a plastic or elastic condition for a short period of time even after cooling from the temperature caused by the blast of hot air.

This lag between the cooling of the transparent rubber hydrochloride and the point at which it becomes subject to damage by distortion allows for the heating of the bag by the blast of hot air, the cooling of the bag, the loading of the bag with the materials to be packaged, and the closing and sealing of the bag without danger of distortion. In fact, it is desirable in packaging materials such as coffee to crimp or press the extensions of the bag against its side in the manner shown in Fig. 4. In this figure the top closure 14 is folded over against the top of the bag and the ears 15 at the top also are folded against the side of the bag. Similarly, the ears 15 of the bottom of the bag are folded against the side of the bag. A desirable shape may be imparted to the loaded container by pressing it in a form. It will be understood that a high pressure is not needed or desirable under such circumstances, since the material from which the bag is composed is subject to penetration by sharp particles of coffee or the like.

Normally when a container of the type shown in Fig. 4 is constructed without the intermediate blast of hot air, the stresses set up by the folding operations of the material cause a high percentage of failures of the bags. This is particularly true in such cases as where the bags are used for the vacuum packing of materials. The plastic lag characteristic of the transparent rubber hydrochloride allows the bag to be folded into its irregular crimped or pressed form without encouraging the danger of these failures. In practice the method shows a substantial decrease in bag failures.

It is preferred to open the bag just enough to admit the hot gas and to avoid sticking together of opposite sides of the bag interior for the heat treatment, as it will be seen that this will prevent possible damage to the rubber hydrochloride by squaring the bag for filling prior to the heat softening step. By inserting a paper board or other insulating medium between the walls of the bag before the heating operation the opposite sides of the bag are prevented from sticking together and the heating operation may be conducted with the walls of the bag nearly closed.

The temperature of the air which is blown into the open bag may vary, as may be the time to which the bag is subjected to the blast of hot air. A temperature of between 150° F. and 225° F. for a time of approximately 10 or 20 seconds, depending upon the thickness of the transparent rubber hydrochloride material, has been found satisfactory. High temperatures make the treatment possible for a shorter period of time, as will be understood.

The package which is formed of the material may be in various shapes. The extensions produced in closing the package may be folded otherwise than shown in the drawing and the heating operation may be conducted by other means than the specific type of blower shown in Fig. 3. Where the transparent rubber hydrochloride material is laminated to an outer metal foil, for example, the foil will act as a conductor of heat to produce the desired softening effect upon the inner layer of rubber hydrochloride.

The various changes which may be made in the invention without departing from the scope thereof are intended to be included in the appended claims.

I claim:

1. The method of packaging materials, which comprises subjecting an open container composed of thermoplastic rubber hydrochloride material to the action of heat to momentarily soften said rubber hydrochloride, loading the container with a material to be packaged, and folding the container into closed position before it has lost the softening effect produced in said heating operation.

2. The method which comprises heating a container having a rubber hydrochloride material on the inside and a different kind of material on the outside to soften said rubber hydrochloride material, loading the container with material to be packaged, and forming a closure for the container before the rubber hydrochloride material has lost the softening effect of said heat.

3. The method which comprises blowing a hot gas into the interior of a container having an inner sheet of rubber hydrochloride to soften said rubber hydrochloride, and closing said container and folding the extensions thereof adjacent the body of the container before the rubber hydrochloride has lost the softening effect of said heating operation.

4. The method which comprises blowing hot air into the interior of a container having a paper back and a transparent rubber hydrochloride liner to soften said transparent rubber hydrochloride, loading the open container with a material to be packaged, closing said container and pressing closure extensions adjacent the sides thereof before said transparent rubber hydrochloride loses the softness imparted by the air treatment.

5. The method of packaging materials, which comprises subjecting a container composed at least in part of thermoplastic rubber hydrochloride to the action of heat to soften said rubber hydrochloride, and loading said container with a material to be packaged before said rubber hydrochloride has lost the softness imparted by the heat treatment.

IRVING GURWICK.